(12) United States Patent
Seok

(10) Patent No.: US 10,364,076 B2
(45) Date of Patent: Jul. 30, 2019

(54) CABLE TIE

(71) Applicant: Industry Academic Cooperation Foundation Keimyung University, Daegu (KR)

(72) Inventor: Jae Heuck Seok, Chungcheongnam-do (KR)

(73) Assignee: Industry Academic Cooperation Foundation Keimyung University (KR)

( * ) Notice: Subject to any disclaimer, the term of this patent is extended or adjusted under 35 U.S.C. 154(b) by 13 days.

(21) Appl. No.: 15/577,259

(22) PCT Filed: May 13, 2016

(86) PCT No.: PCT/KR2016/005111
§ 371 (c)(1),
(2) Date: Nov. 27, 2017

(87) PCT Pub. No.: WO2016/190581
PCT Pub. Date: Dec. 1, 2016

(65) Prior Publication Data
US 2018/0141732 A1    May 24, 2018

(30) Foreign Application Priority Data

May 28, 2015    (KR) .................. 10-2015-0075130

(51) Int. Cl.
  *B65D 63/10*    (2006.01)
  *F16L 3/233*    (2006.01)
  *F16B 2/08*    (2006.01)
  *H02G 3/32*    (2006.01)

(52) U.S. Cl.
  CPC ..... *B65D 63/1027* (2013.01); *B65D 63/1072* (2013.01); *F16B 2/08* (2013.01);
(Continued)

(58) Field of Classification Search
  CPC .......... B65D 2563/103; B65D 63/1027; B65D 63/1072; F16B 2/08; F16L 3/233; F16L 3/2334; H02G 3/32
  See application file for complete search history.

(56) References Cited

U.S. PATENT DOCUMENTS

| 3,731,347 A * | 5/1973 | Caveney | B65D 63/1072 24/16 PB |
| 3,739,430 A * | 6/1973 | Kohke | B65D 63/1063 24/16 PB |

(Continued)

FOREIGN PATENT DOCUMENTS

| JP | 2008007161 A | 1/2008 |
| JP | 2011229355 A | 11/2011 |

(Continued)

OTHER PUBLICATIONS

International Search Report of PCT/KR2016/005111, dated Aug. 30, 2016, 2 pages.

*Primary Examiner* — Robert Sandy
*Assistant Examiner* — David M Upchurch
(74) *Attorney, Agent, or Firm* — Blank Rome LLP

(57) ABSTRACT

Disclosed is a cable tie including a tie band which is formed in a shape of a strap to bind cables, and is provided with a plurality of serrated grooves continuously formed on a one surface thereof in a longitudinal direction, and a tie holder which is connected to one end of the tie band and includes a tie band passage, through which the other end of the tie band passes, and a serrated locking protrusion formed on an inner surface of the tie band passage and interference-latched to the serrated grooves. The tie band is provided with a cut guide groove formed on one or both widthwise edges thereof, so that a free end of the tie band remaining when the (Continued)

tie band binds the cables together is cut off by a rotating force generated when the free end is twisted, without using a cutting tool.

1 Claim, 8 Drawing Sheets

(52) U.S. Cl.
CPC ............ *F16L 3/233* (2013.01); *F16L 3/2334* (2013.01); *H02G 3/32* (2013.01); *B65D 2563/103* (2013.01)

(56) References Cited

U.S. PATENT DOCUMENTS

| | | | | |
|---|---|---|---|---|
| D256,438 S | * | 8/1980 | Woods | D8/394 |
| 6,151,761 A | * | 11/2000 | Thompson | E05B 75/00 24/16 PB |
| 6,507,979 B1 | * | 1/2003 | Thompson | E05B 75/00 24/16 PB |
| 7,131,168 B2 | * | 11/2006 | Pangallo | B65D 63/1063 24/16 PB |
| 2006/0096066 A1 | * | 5/2006 | Wambaugh | B65D 63/1063 24/16 PB |
| 2007/0028426 A1 | * | 2/2007 | Laporte | B65D 63/1063 24/16 PB |

FOREIGN PATENT DOCUMENTS

| | | |
|---|---|---|
| KR | 200419203 Y1 | 6/2006 |
| KR | 20080003053 U | 8/2008 |
| KR | 10-1155468 B1 | 6/2012 |

* cited by examiner

[Fig. 1]
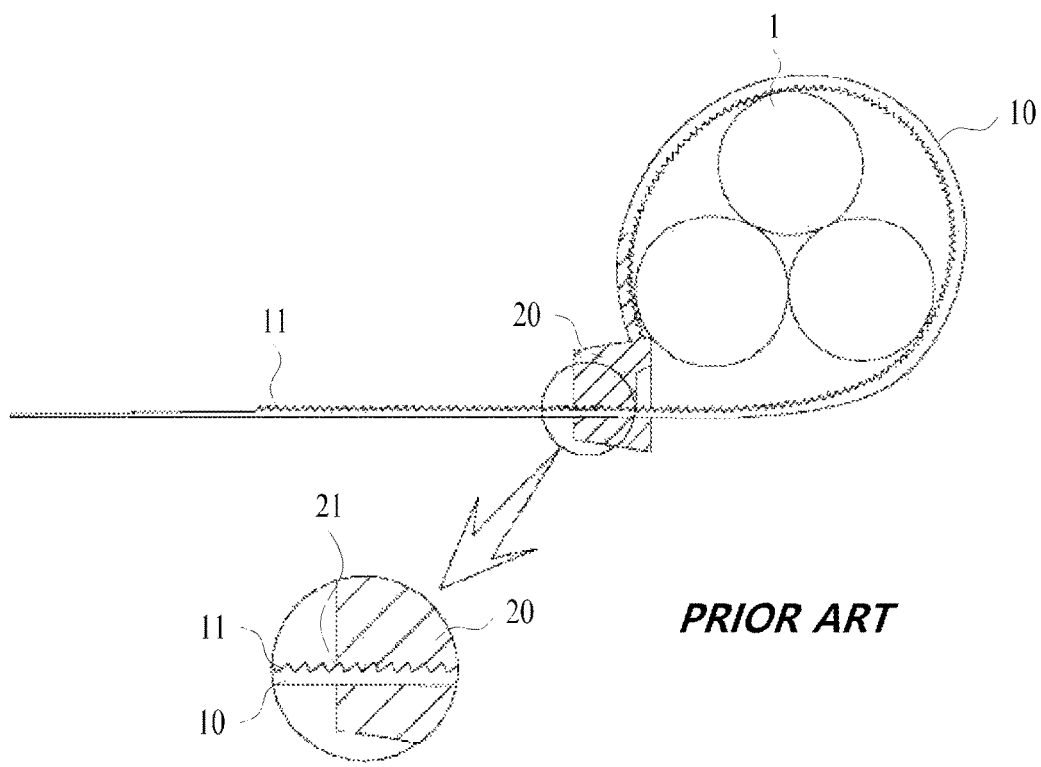
PRIOR ART

[Fig. 2]
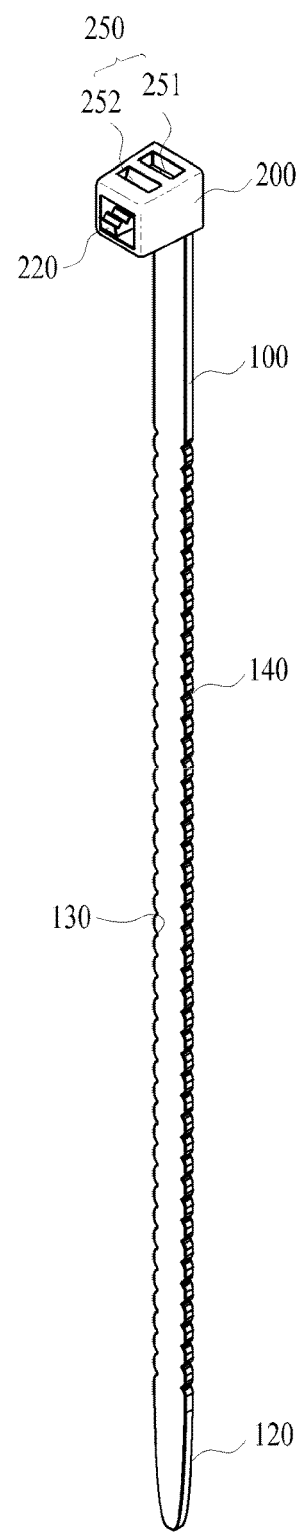

[Fig. 3]
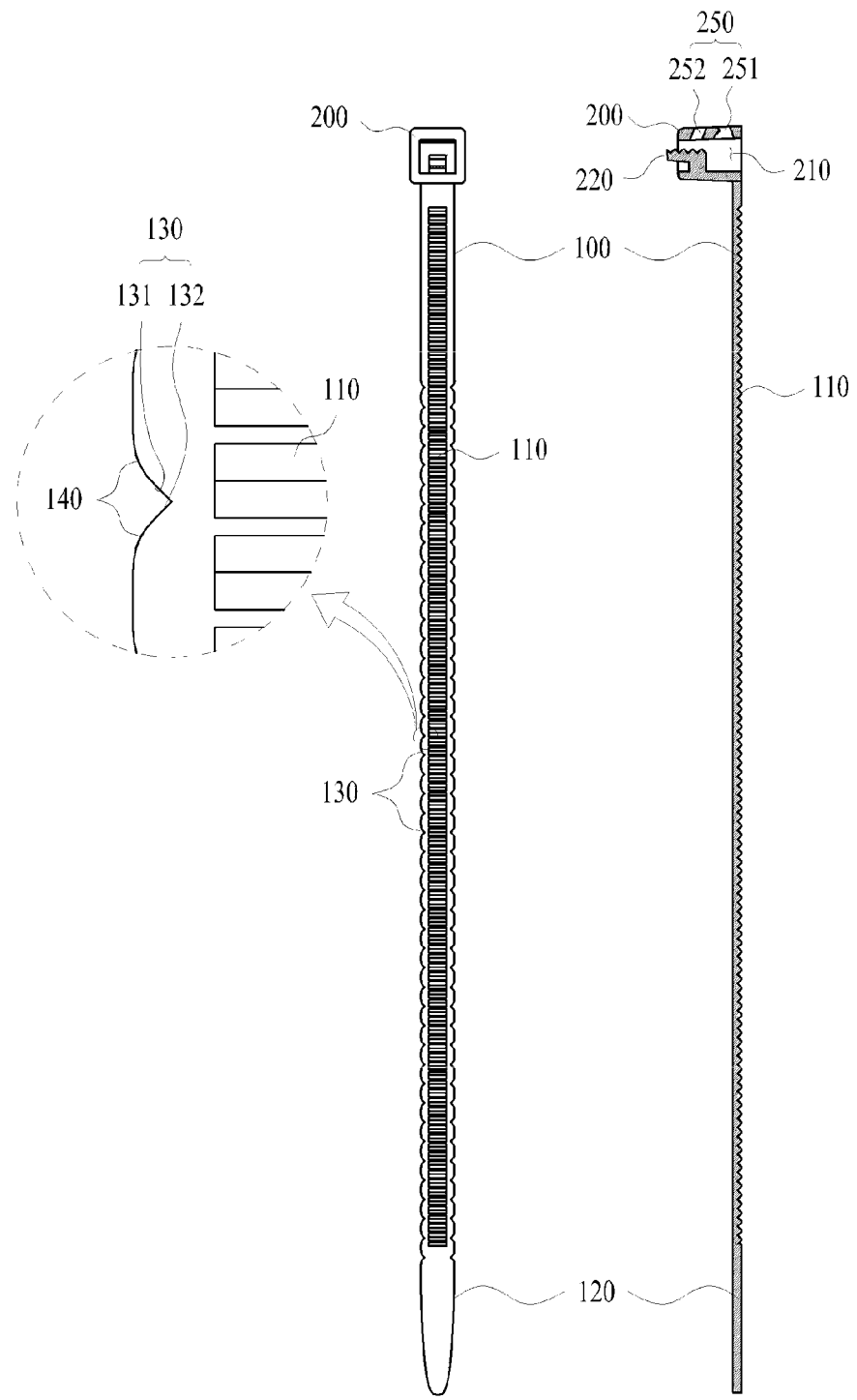

[Fig. 4]
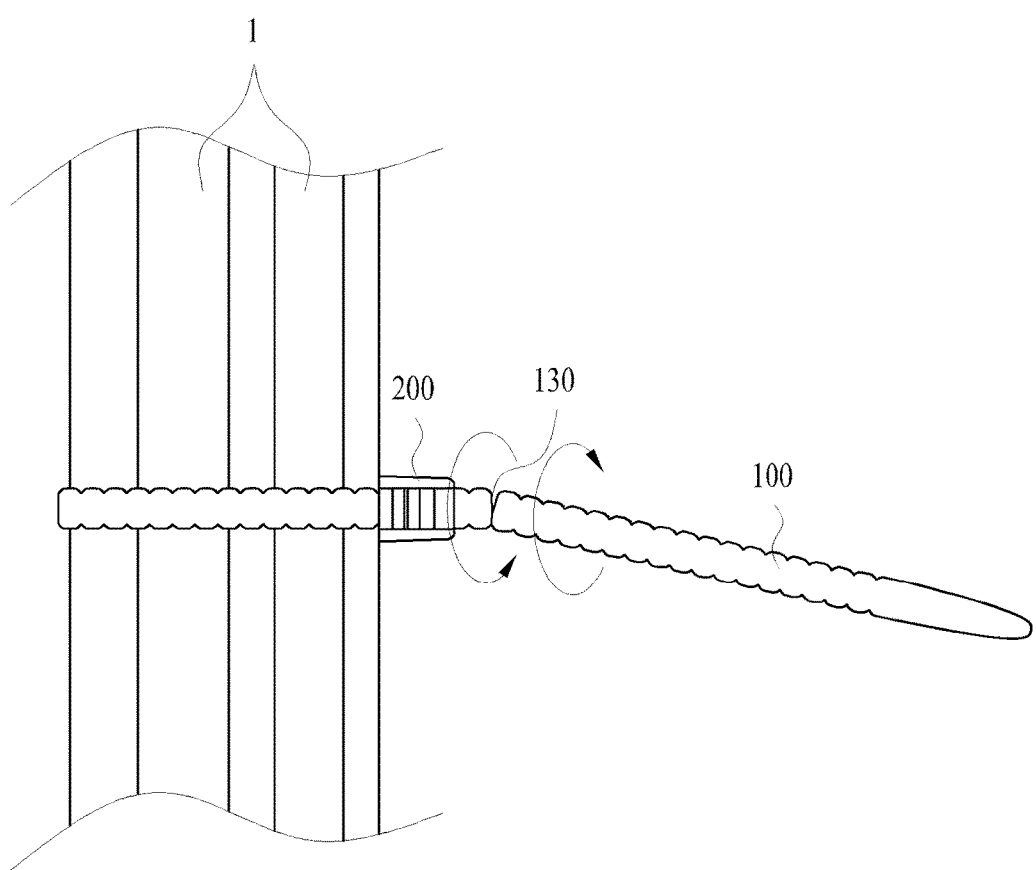

[Fig. 5]
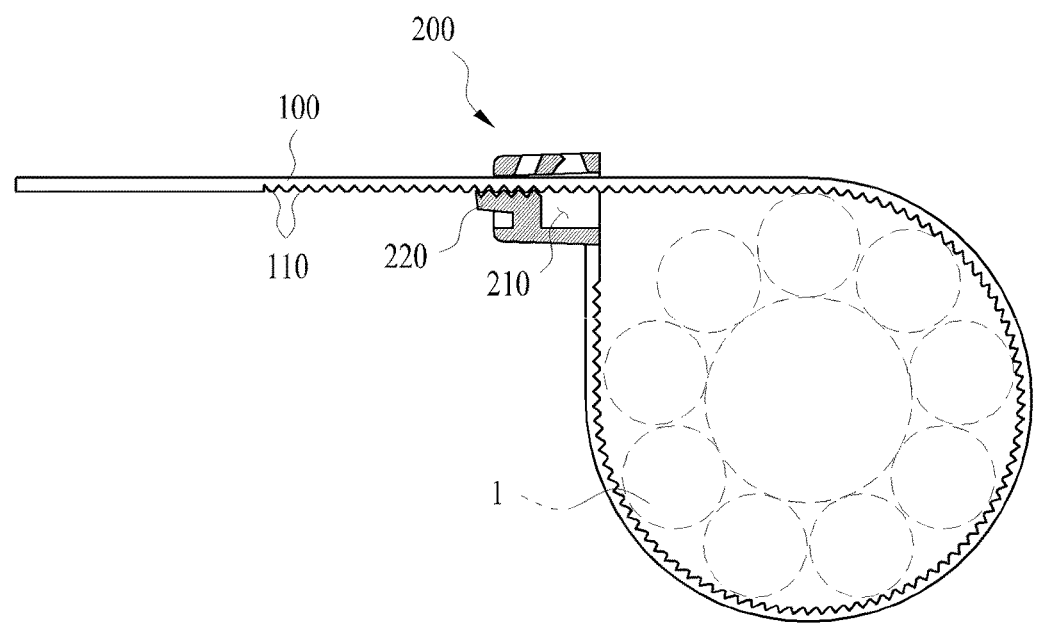

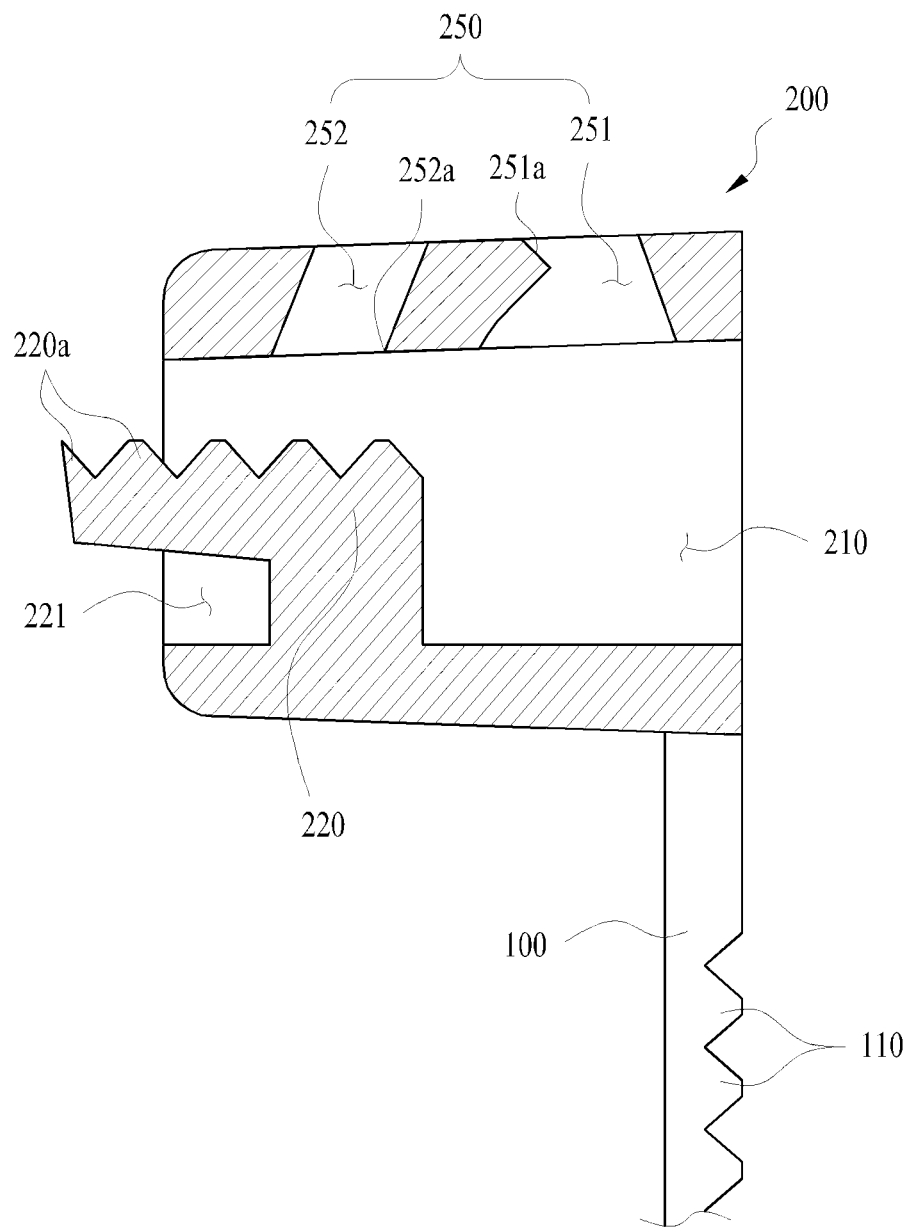
[Fig. 6]

[Fig. 7]
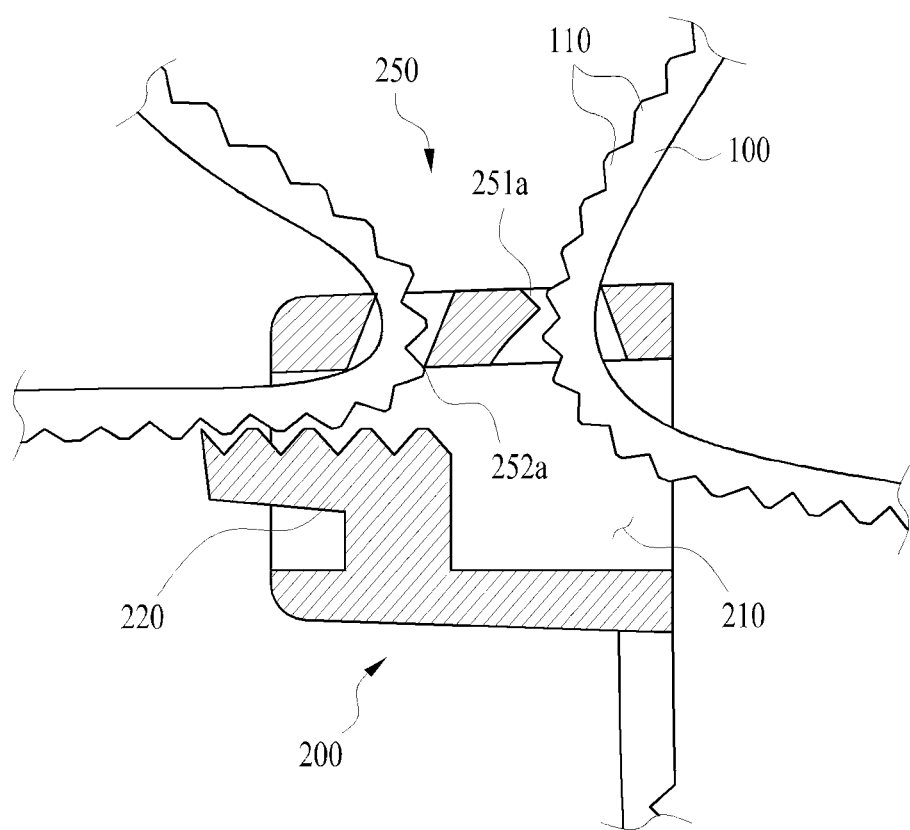

[Fig. 8]
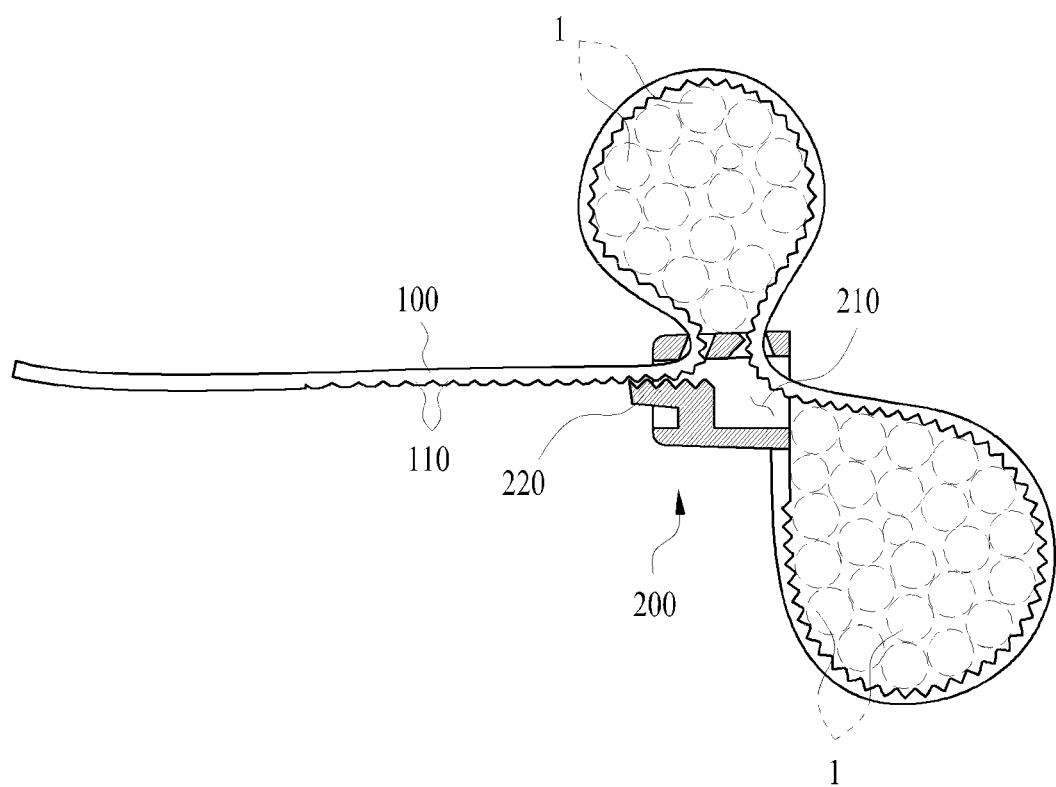

CABLE TIE

RELATED APPLICATIONS

This application is a national phase of PCT/KR2016/005111, filed on May 13, 2016, which claims the benefit of Korean Application No. 10-2015-0075130, filed on May 28, 2015. The entire contents of those applications are hereby incorporated by reference.

TECHNICAL FIELD

The present invention relates to a cable tie, and, more particularly, to a cable tie which holds a plurality of cables together, in which a remaining free end of the cable tie can be conveniently cut off, without using a separate cutting tool, and the cable tie can separately hold the cables by two bundles according to the number of cables or a diameter thereof, thereby improving binding effectiveness.

BACKGROUND ART

In general, a cable tie is a tool capable of neatly holding tubes or electric cables together which are used at offices, houses and factories.

A cable tie according to the related art will now be described with reference to FIG. 1.

As illustrated in the drawing, the cable tie according to the related art includes a tie band 10 of a long strap to enclose cables 1, and a tie holder 20 connected to one end of the tie band 10, in which the other end of the tie band 10 goes through the tie holder 20 to form a loop.

The tie band 10 is provided with a plurality of serrated grooves 11 continuously formed on a one surface thereof in a longitudinal direction, and the tie holder 20 is provided with a locking protrusion 21 formed on an inner surface, the locking protrusion being latched to the serrated groove 11 to prevent the tie band 10 from being pulled back from the tie holder.

When a user wants to organize a plurality of cables 1 by the cable tie according to the related art, the user penetrates a free end of the tie band 10 through the tie holder 20 in the state in which the tie band 10 binds the plurality of cables 1 together, and then pulling continuously the free end penetrated until the tie band 10 is brought into close contact with the cables 1. The latching work of the cable tie is completed by cutting the remaining free end of the tie band 10 remaining after it holds the cables, by use of a cutting tool, such as a knife or a pair of scissors.

In case of the cable tie according to the related art, however, there is a drawback in that the user should carry the cutting tool, such as a knife or a pair of scissors, to remove the remaining free end of the tie band 10. If the remaining free end of the tie band is left intact, without being cut by use of the cutting tool, there is a problem in that it will disfigure the appearance of the cable organization due to the structure of the cable tie, of which the free end protrudes perpendicularly from the cables 1, as compared to the state before the cables are organized.

In case where the whole diameter of the cables 1 to be bound is increased due to the large number, since only one cable tie cannot bear a binding force, two or more cable ties should be used in cooperation with each other. Therefore, there are problems in that working steps and the number of necessary cable ties are significantly increased, and occurrence risk of electric accident is high.

In addition, if the free end of the tie band is cut by use of the cutting tool, the user can be injured by a sharp cut surface, or clothes may be damaged.

DISCLOSURE

Technical Problem

Accordingly, the present invention has been made in view of the problems occurring in the related art, and an object of the present invention is to provide a cable tie which holds a plurality of cables together, in which a remaining free end of the cable tie can be conveniently cut off, without using a separate cutting tool, and the cable tie can separately hold the cables by two bundles according to the number of cables or a diameter thereof, thereby improving binding effectiveness.

Another object of the present invention to provide a cable tie capable of preventing a user from being injured or clothes from being damaged.

Technical Solution

To accomplish the above objects, there is provided a cable tie including: a tie band which is formed in a shape of a strap to bind cables, and is provided with a plurality of serrated grooves continuously formed on a one surface thereof in a longitudinal direction, and a tie holder which is connected to one end of the tie band and includes a tie band passage, through which the other end of the tie band passes, and a serrated locking protrusion formed on an inner surface of the tie band passage and interference-latched to the serrated grooves, wherein the tie band is provided with a cut guide groove formed on one or both widthwise edges thereof, so that a free end of the tie band remaining when the tie band binds the cables together is cut off by a rotating force generated when the free end is twisted, without using a cutting tool.

The cut guide groove has a first grooved slope surface and a second grooved slope surface which are recessed on an inner surface in a sharp shape in such a way that a width of the tie band is gradually decreased from an edge surface of the tie band to an inside, and a plurality of cut guide grooves are formed at regular intervals along the longitudinal direction of the tie band.

The cable tie further includes an auxiliary latching member to separately bind the cables by two bundles, with the tie holder being interposed between cable bundles.

The auxiliary latching member includes a first auxiliary passage which upwardly guides the tie band entering an entrance of the tie band passage and has a first guide locking protrusion to be interface-engaged with the serrated grooves, and a second auxiliary passage which is formed at an exit of the tie band passage to guide the tie band passing the first auxiliary passage to the exit of the tie band passage and having a second guide locking protrusion to be interface-engaged with the serrated grooves.

Both corners of the recessed surface of the tie band which are cut at the cut guide groove are provided with an arc curved portion having a curvature radius.

Advantageous Effects

With the above configuration, since the cut guide grooves are formed on one or both widthwise edges of the tie band, the free end of the tie band can be easily cut off, without using a cutting tool. Therefore, it is possible to solve the inconvenient problem in that the user should carry the cutting tool.

Also, since tie holder is provided with the auxiliary latching member to separately hold the cables by two bundles, with the tie holder being interposed between two cable bundles, it is possible to prevent the problem caused by using only one cable tie, i.e., the binding force from being decreased, and, if necessary, to sort the cables by kind, color or diameter. Furthermore, it is possible to significantly reduce the accident caused by the short circuit.

In addition, since both corners of the recessed surface of the tie band which are cut at the cut guide groove are provided with the arc curved portion having a curvature radius, it is possible to prevent the user from being injured or clothes from being damaged.

DESCRIPTION OF DRAWINGS

FIG. 1 is a cross-sectional view illustrating a configuration of a cable tie according to the related art.

FIG. 2 is a perspective view illustrating a cable tie according to one embodiment of the present invention.

FIG. 3 is a front view and a cross-sectional view of FIG. 2.

FIG. 4 is a view illustrating a process of cutting a remaining free end of the tie band of FIG. 2 by a rotating force generated when the free end is twisted.

FIG. 5 is a cross-sectional view illustrating an applying state of a cable tie according to another embodiment of the present invention, when seen from a plan.

FIG. 6 is a cross-sectional view illustrating the configuration of the tie holder and an auxiliary latching member in FIG. 2.

FIG. 7 is a cross-sectional view illustrating an applying state of the auxiliary latching member in FIG. 6.

FIG. 8 is a cross-sectional view illustrating a binding state of the auxiliary latching member of FIG. 6 in which cables are separated to two bundles and bound.

MODE FOR INVENTION

Now, preferred embodiments of the present invention will be described in detail with reference to the accompanying drawings.

As illustrated in the drawings, a cable tie according to the present invention includes a tie band 100 formed in the shape of a strap to bind cables 1, and provided with a plurality of serrated grooves 110 continuously formed on a one surface thereof in a longitudinal direction, and a tie holder 200 connected to one end of the tie band 100 and having a tie band passage 210, through which the other end of the tie band 100 passes, and a serrated locking protrusion 220 formed on an inner surface of the tie band passage 210 and interference-latched to the serrated grooves 110.

The tie band 100 is an elongated strap extending in a desired length to bind a plurality of cables 1 together in a circumferential direction, and is made from a synthetic resin having a flexible property.

The plurality of serrated grooves 110 are continuously formed on one elongated surface of the tie band 100 in the longitudinal direction.

The tie band 100 is provided with a tap 120 formed at a free end thereof so that the tie band can easily insert into the tie holder 200 which will be described later, and a user can easily pull the tie band.

In particular, the tie band 100 according to the present invention is provided with cut guide grooves 130 formed on both widthwise edges thereof, so that the free end remaining when the tie band binds the cables 1 together can be cut off by a rotating force generated when the free end is twisted, without using a cutting tool (see FIG. 3).

Each of the cut guide grooves 130 has a first grooved slope surface 131 and a second grooved slope surface 132 which are recessed on an inner surface in a sharp shape in such a way that a width of the tie band 100 is gradually decreased from an edge surface of the tie band to an inside.

Specifically, by twisting (by applying torsional stress) the first grooved slope surface 131 and the second grooved slope surface 132 which are recessed toward the inside of the tie band 100 in an opposite direction, the remaining free end of the tie band 100 can be easily cut, without using a separate cutting tool, thereby solving an inconvenient problem in that a user should carry the cutting tool (see FIG. 4).

In case of neatly binding the cables 1 by the tie band 100 according to the present invention and then removing the bound tie band 100 to again organize the cables 1, the tie band 100 can be cut off by twisting the tie band 100 in the same method as that of removing the free end remaining after the tie band binds the cables 1, if there is a desired gap between the tie band and the cables in a circumferential direction.

If there is no gap between the tie band and the cables in the circumferential direction, the user can use a knife. Even though the user uses the knife, the knife can be guided along the cut guide groove 130 in a cut direction which is a traveling direction of the knife.

The cut guide grooves 130 according to the present invention are preferably formed on both widthwise edge surfaces of the tie band 100, but the present invention is not limited thereto. The cut guiding groove may be formed on any one of both widthwise edge surfaces of the tie band 100.

Both corners of the recessed surface of the tie band 100 which are cut at the cut guide groove 130 are provided with an arc curved portion 140 having a curvature radius (see FIG. 3).

Corners of the recessed surface of the tie band 100 become smooth by the curved portion 140 after the tie band is cut off, thereby preventing the user from being injured or clothes from being damaged.

The tie holder 200 is connected to one end of the tie band 100 in the longitudinal direction, and is designed to render the tie band 100 enclosing the cables 1 to stably maintain a loop shape.

As illustrated in FIG. 6, the tie holder 200 has the tie band passage 210, through which the free end of the tie band 100 passes, and the serrated locking protrusion 220 formed on the inner surface of the tie band passage 210 and interference-latched to the serrated grooves 110.

The serrated locking protrusion 220 is provided with a plurality of pawls 220a which are engaged with the serrated grooves 110 of the tie band 100 to prevent the tie band from being pulled back.

One or more pawls 220a among the plurality of pawls 220a of the serrated locking protrusion 220 protrude outwardly from the tie holder 200. The serrated locking protrusion 220 is provided with a resilient cavity portion 221 which can be resiliently moved in a vertical direction by a clamping force generated when the tie band 100 is pulled.

Specifically, the resilient cavity portion 221 can prevent the serrated locking protrusion 220 from forcedly prelatching to the serrated grooves 110 in the process of pulling the tie band 100, and also can reduce distribution of a pulling force on the tie band 100.

The tie holder 200 according to the present invention further includes an auxiliary latching member 250 to separately bind the cables 1 by two bundles, with the tie holder 200 being interposed between two cable bundles.

Specifically, the auxiliary latching member 250 has a first auxiliary passage 251 which upwardly guides the tie band 100 entering an entrance of the tie band passage 210 and has a first guide locking protrusion 251a to be interface-engaged with the serrated grooves 110, and a second auxiliary passage 252 formed at an exit of the tie band passage 210 to guide the tie band 100 passing the first auxiliary passage 251 to the exit of the tie band passage 210 and having a second guide locking protrusion 252a to be interface-engaged with the serrated grooves 110.

The auxiliary latching member 250 is formed in an upper portion of the tie holder 200 to bind two cable bundles separately according to the number of cables 1 and a diameter, thereby improving binding effectiveness.

In other words, in case where the whole diameter of the cables 1 to be bound is increased due to the large number, since only one cable tie cannot bear a binding force, two or more cable ties should be used in cooperation with each other. Therefore, if the plurality of cables 1 are appropriately separated into two bundles, and two cable bundles are separately bound, it is possible to prevent the binding force from being decreased, and, if necessary, to sort the cables by kind, color or diameter (see FIG. 8).

In addition, if the cables 1 are separately bound by two bundles, it is possible to significantly reduce an accident caused by short circuit.

The first auxiliary passage 251 is formed in a trapezoidal shape, of which a bottom side is wider than a top side, when seen from a cross section, so that the tie band 100 can be guided to easily come in the first auxiliary passage 251 in an upward direction, and be smoothly bent in a loop shape. The first guide locking protrusion 251a protrudes from the surface opposite to the serrated grooves 110 of the tie band 100.

The second auxiliary passage 252 is formed in a parallelogram shape, of which opposite sides are parallel and of equal length, when seen from a cross section, so that the tie band 100 can be guided to easily come to the serrated locking protrusion 220, and be smoothly bent in a loop shape. The second guide locking protrusion 252a protrudes from the surface opposite to the serrated grooves 110 of the tie band 100.

With the above configuration, since the cut guide grooves 130 are formed on one or both widthwise edges of the tie band 100, the free end of the tie band 100 can be easily cut off, without using a cutting tool. Therefore, it is possible to solve the inconvenient problem in that the user should carry the cutting tool.

Also, since tie holder 200 is provided with the auxiliary latching member 250 to separately hold the cables 1 by two bundles, with the tie holder being interposed between two cable bundles, it is possible to prevent the problem caused by using only one cable tie, i.e., the binding force from being decreased, and, if necessary, to sort the cables by kind, color or diameter. Furthermore, it is possible to significantly reduce the accident caused by the short circuit.

In addition, since both corners of the recessed surface of the tie band 100 which are formed by the cut guide groove are provided with the arc curved portion 140 having a curvature radius, it is possible to prevent the user from being injured or clothes from being damaged.

The invention claimed is:

1. A cable tie comprising:
a tie band which is provided with a plurality of serrated grooves continuously formed on a one surface thereof in a longitudinal direction to bind cables, and
a tie holder which is connected to one end of the tie band and includes a tie band passage, through which the other end of the tie band passes, and a serrated locking protrusion formed on an inner surface of the tie band passage and interference-latched to the serrated grooves,
wherein the tie band is provided with a cut guide groove formed on both widthwise edges thereof,
wherein the cut guide groove has a first grooved slope surface and a second grooved slope surface which are recessed in such a way that a width of the tie band is gradually decreased from the widthwise edges of the tie band to an inside, and a plurality of cut guide grooves are formed at regular intervals along the longitudinal direction of the tie band,
wherein the cable tie further comprises an auxiliary latching member to separately bind the cables by two bundles, with the tie holder being interposed between cable bundles,
wherein the auxiliary latching member includes a first auxiliary passage which upwardly guides the tie band entering an entrance of the tie band passage and has a first guide locking protrusion to be interface-engaged with the serrated grooves, and
a second auxiliary passage which is formed at an exit of the tie band passage to guide the tie band passim, the first auxiliary passage to the exit of the tie band passage and having a second guide locking protrusion to be interface-engaged with the serrated grooves,
wherein arc curved portions are formed between the cut guide groove and the widthwise edges.

* * * * *